United States Patent
De Graaff

(10) Patent No.: US 6,530,766 B1
(45) Date of Patent: *Mar. 11, 2003

(54) DEVICE FOR MANUFACTURING INFORMATION CARRIERS BY INJECTION MOULDING

(75) Inventor: Jan Leendert Johannes De Graaff, Waalwijk (NL)

(73) Assignee: Axxicon Moulds Eindhoven B.V., Son (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,526

(22) Filed: Jan. 30, 1998

(30) Foreign Application Priority Data

Jan. 31, 1997 (NL) ............................................. 1005148
Mar. 27, 1997 (NL) ............................................. 1005663

(51) Int. Cl.⁷ .......................... B29C 45/80; B29C 45/84
(52) U.S. Cl. .................. 425/150; 425/183; 425/192 R; 425/210; 425/810
(58) Field of Search ................................. 425/183, 185, 425/186, 192 R, 210, 810, 3, 150

(56) References Cited

U.S. PATENT DOCUMENTS

| 3,271,483 A |   | 9/1966 | Phillipson et al. ........... 425/155 |
| 4,425,091 A | * | 1/1984 | Prince ......................... 425/589 |
| 5,056,430 A |   | 10/1991 | Bayerlein et al. ........... 101/211 |
| 5,580,599 A | * | 12/1996 | Fehr ............................ 425/323 |
| 5,626,885 A | * | 5/1997 | Vromans ..................... 425/810 |
| 5,679,385 A | * | 10/1997 | Adams et al. .............. 425/210 |
| 5,687,542 A | * | 11/1997 | Lawecki et al. ............. 425/210 |
| 6,056,530 A | * | 5/2000 | Van Hout .................... 425/150 |

FOREIGN PATENT DOCUMENTS

| CH | 663929 | 1/1988 |
| EP | 0296677 | 12/1988 |
| EP | 0537953 | 4/1993 |
| GB | 2287210 | 9/1995 |
| WO | 9419166 | 9/1994 |

* cited by examiner

*Primary Examiner*—Jan H. Silbaugh
*Assistant Examiner*—Emmanuel Luk
(74) *Attorney, Agent, or Firm*—Webb Ziesenheim Logsdon Orkin & Hanson, P.C.

(57) ABSTRACT

An auxiliary device is disclosed for use with an injection molding apparatus for manufacturing disc-like information carriers. The device includes a holding device for holding an insert plate in a desired position, and a transporter, with at least two heads, for transporting successive insert plates between a plate supply holder and the mold. Each head centers and properly positions each plate within the mold using a tapered centering pin which extends from the head and into the mold wall.

30 Claims, 7 Drawing Sheets

DEVICE FOR MANUFACTURING INFORMATION CARRIERS BY INJECTION MOULDING

BACKGROUND OF THE INVENTION

For the manufacture of optical information carriers and the like, such as compact discs, VLPs, NODs, recordable discs, use is made of an injection mould with a mould cavity in which the mechanical information to be carried by the information carrier is to be found in negative form. The information component carrying the relevant information can for instance be embodied as a part of the mould, or as a so-called "stamper". A stamper is a plate generally embodied in nickel, on the active surface of which the information is pre-arranged by per se known means. The relevant information will generally be of the digital type and consist of an alternation of either elevations or recesses and flat, unprocessed parts. The information is generally recorded on the information carrier in a spiral-shaped track.

After an information component has been used for manufacturing a determined number of information carriers the quality of the information carriers manufactured therewith deteriorates and the information component in question must be replaced. The information component must thus be replaced when the desired number of information carriers has been manufactured or when it has manufactured the maximum number of information carriers acceptable within a set quality standard.

The object of the invention is to furnish provisions enabling a very rapid change of information components such as stampers in order to thus make the time in which the injection moulding machine is not being used as short as possible.

SUMMARY OF THE INVENTION

With a view thereto the invention provides an auxiliary device intended to be added to an injection moulding device for manufacturing disc-like information carriers,
which injection moulding device comprises:
  a mould having at least two mould parts displaceable relative to each other,
  which in a first relative position bound a mould cavity, the form of which corresponds with the form of the information carriers for manufacture, into which mould cavity debouches a feed for heated plastic,
  and which in a second relative position are located at a distance from each other such that the mould cavity is accessible;
  holding means for holding an insert plate in a desired position, for example an insert plate for placing against an end wall of the mould cavity, on which plate is found the information to be recorded onto the information carrier, such that an insert plate remains in position relative to the mould cavity when a formed information carrier is removed;
which auxiliary device comprises:
  a supply holder in which at least one insert plate can be received;
  transporting means for transporting successive insert plates between the supply holder and the mould,
  which transporting means comprise two heads which are each adapted to displace successive insert plates in axial direction to and from said end wall, all of which plates are provided with a central continuous hole, and which two heads each comprise centering means for placing an insert plate in correct position relative to the end wall by making use of a continuous hole in an insert plate;
  control means connected or connectable to the injection moulding device,
  which are adapted to release the transporting means only in the second relative position of the mould parts in order to transport an insert plate from or to the mould,
  and which are adapted to control the holding means,
  wherein the transporting means are controllable by the control means.

The use of two heads has the great advantage that for instance in one joint movement or with two related movements the one head can remove an insert plate already present in the mould and the already waiting second head can then place a new insert plate without it first being necessary for the first head to place the removed insert plate back into the supply holder. It will be apparent that this double head according to the invention can very considerably reduce the time required to change insert plates.

A very simple embodiment is that wherein the heads are supported by a collective carrier which is controllable by the control means.

The auxiliary device can for instance be embodied such that the carrier has a degree of freedom of translation.

In an alternative the auxiliary device has the special feature that the carrier has a degree of freedom of rotation.

This latter variant is preferably embodied such that the carrier is pivotable round a pivot axis, relative to which the heads are equidistant.

In order to prevent dust, which is undesirable in the manufacture of information carriers, the embodiment is recommended in which the supply holder comprises a closable supply holder.

A specific embodiment has the special feature that the supply holder comprises individually closable compartments, in each of which can be received an information component.

A variant which very effectively prevents the information components being subject to picking up dust is that in which the supply holder can be connected to a source of substantially dust-free gas, such as air under a certain overpressure. In this context "overpressure" is understood to mean a pressure relative to the ambient pressure such that there is no danger of air from outside being drawn into the supply holder in uncontrolled manner through cracks. A small overpressure relative to the ambient pressure is sufficient for this purpose.

A specific embodiment has the special feature that each compartment can be connected to a source of gas under pressure.

An embodiment which lends itself easily to automation has the special feature that the supply holder and the transporting means are relatively movable and positionable such that the transporting means can remove an information component from the supply holder or place it therein at a chosen location thereof.

In addition to the provisions discussed in the two previous paragraphs, an auxiliary device operating fully automatically is also provided with a central processing unit in which is pre-recorded data relating to the information component present at each location in the supply holder and relating to a desired sequence for control of the positioning of the supply holder in relation to the transporting means.

An alternative has the special feature that the central processing unit comprises memory means into which is read in each case which information component is arranged at a specific location in the supply holder.

As the case arises, it may be practical if a transfer station is also situated between the supply holder and the injection mould. In this respect attention is also drawn to the fact that the supply holder and the transporting means have only to be relatively movable. The supply holder can thus for instance be mobile, while the transporting means are movable substantially in the same plane, while alternatively the supply holder can occupy a fixed position which is accessible at any desired location due to the multiple mobility of the transporting means.

The information components can be stored and transported vertically, horizontally or in any other desired position. The supply holder can be movable in linear or rotating manner relative to the transporting means. Combinations are also possible. The information components can be held in position in the injection mould with all suitable means. These means are for instance underpressure, mechanical means and magnetic and electromagnetic means. Reference is also made in this respect to EP-B-0 177 991.

In order to obtain a very reliable centering while completely avoiding possible damage to the insert plates, the auxiliary device can be embodied such that the centering means comprise a for instance blunt pin tapering toward the outside.

In order to bring an insert plate as rapidly as possible to the same temperature as the relevant mould wall and to place it such that shifting relative to this end wall through dilatation or contraction is avoided, the auxiliary device can advantageously be embodied such that the heads comprise heating means.

In some conditions it may be favourable not to have the device operate fully automatically but to have the option of intervening in a cycle. An auxiliary device suitable for this purpose has the special feature that the control means are adapted to control the heads such that they are temporarily halted in their path between supply holder and mould for manual placing or removal of an insert plate.

Any suitable electric motor can be used to control the transporting means in combination with position sensors or the like, on the basis of which the central processing unit can determine where a head is situated at any moment. Very simple however is the embodiment in which the transporting means comprise a stepping motor. This embodiment avoids the use of the position sensors in a negative feedback loop.

As discussed above, use can advantageously be made of a flow of dust-free gas through the supply holder.

In this respect the auxiliary device preferably has the feature that the gas flow is substantially laminar. A turbulent flow can have the drawback of stirring up possibly present and deposited dust particles.

The auxiliary device is preferably embodied such that the gas flow is directed downward. Stirring-up of deposited dust can hereby also be prevented.

A specific preferred embodiment comprises ionization means for ionizing the gas. Such an embodiment eliminates static charge of dust particles in the through-fed gas flow, whereby less deposition onto the information-carrying insert plate can take place.

An embodiment with ionization means is that in which the ionization means comprise corona means. As is known, a corona source can comprise a number of sharply pointed electrodes which have a very high potential relative to another surface, for instance in the order of 5–50 kV. An active corona source is recognizable from its light-emitting character, which indicates excited condition of the atoms present in the gas.

Other ionization means can also be used, for instance tribo-means and radio-active means. Corona means have the advantage however of enabling very simple embodiment and of operating in very stable and reliable manner.

A specific embodiment has the special feature that the central processing unit is also adapted to adjust process parameter values relevant for the injection moulding process on the basis of certain, predetermined properties of an insert plate, corresponding for instance with the playing time of a CD to be manufactured therewith. This variant can be incorporated in an auxiliary device in which, as according to an already stated aspect of the invention, the central processing unit comprises memory means into which is read in each case which insert plate is arranged at a specific location in the supply holder.

In the above mentioned embodiment in which use is made of a centering pin tapering toward the outside, the auxiliary device according to the invention can advantageously have the special feature that each head bears a centering pin narrowing toward its free end which during positioning and/or removal of an insert plate extends in coaxial relation to the mould cavity and which can co-act in positioning manner with a central positioning hole which debouches on the mould wall against which an insert plate must be positioned, wherein the centering pin is arranged spring-loaded to the outside relative to an auxiliary head which is axially movable by means of drive means for placing and removal of an insert plate. Such a structure ensures that positioning of the insert plate relative to the relevant end wall can take place with very high precision. As a consequence of the fact that the centering pin has a tapering form, a completely exact centering takes place in all conceivable conditions. It will be apparent that a condition for good operation is that the edge of the hole in the relevant mould wall can always co-act with the tapering portion of the centering pin.

A specific embodiment has the special feature that the auxiliary head comprises an annular support surface for carrying an insert plate, in addition to a positioning cylinder which is placed coaxially with the centering pin and which co-acts in positioning manner with the central hole in the insert plate.

Very simple and reliable in operation is the variant in which the drive means comprise a number of pneumatic cylinders or bellows which are connected to an on/off switchable vacuum source and which are connected between a main frame of a head and the auxiliary head such that when the vacuum source is switched on the auxiliary head is displaced outward relative to said main frame, wherein after the vacuum source has been switched off the auxiliary head is returned to an inward directed rest position by resetting spring means. The use of bellows in particular enables a very inexpensive but nevertheless extremely reliable embodiment.

In the most refined form, an automatic, pre-programmable changing of the information components can take place with the auxiliary device according to the invention without any intervention by personnel.

BRIEF DESCRIPTION OF THE DRAWINGS

The invention will now be elucidated with reference to the annexed drawing, in which.

DETAILED DESCRIPTION OF THE INVENTION

Figure 1:
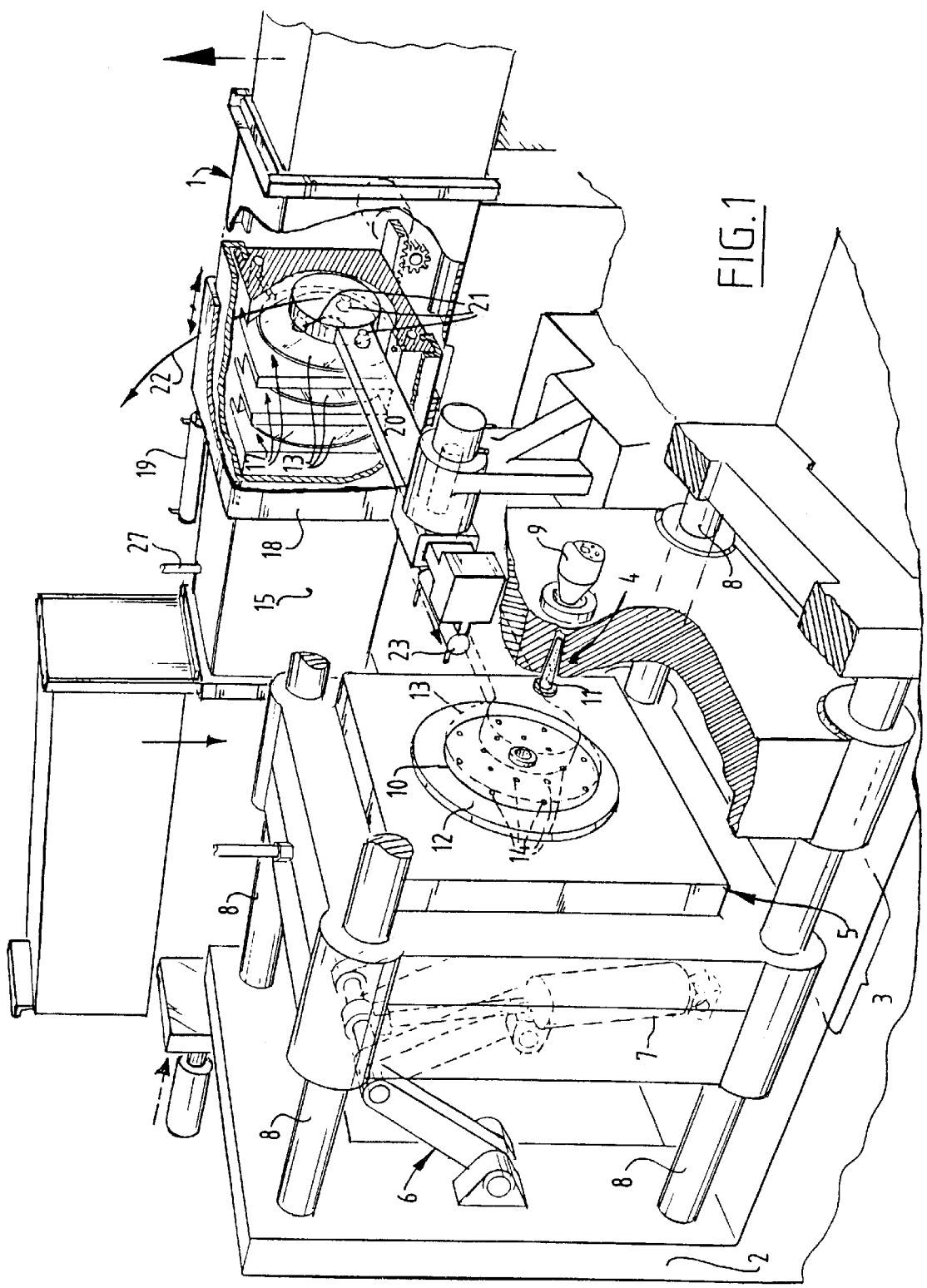
FIG. 1 shows a partly broken away perspective view of an injection mould having an auxiliary device with one head, wherein the supply holder is displaceable linearly.

FIG. 1 shows an auxiliary device 1 which is added to an injection moulding device 2 for manufacturing disc-like information carriers.

The injection moulding device comprises a mould 3 with two mould parts 4, 5 displaceable relative to each other. By means of a lever mechanism 6 and a hydraulic cylinder 7 the mould part 5 can be moved reciprocally, wherein guiding takes place with four guide rods which, for the sake of convenience, are all designated with 8 and which are ordered in a square pattern. The relatively fixed mould part 4 can be coupled to the nozzle 9 of a plasticizing unit.

In a first, closed relative position the mould parts 4 and 5 bound a mould cavity 10, the form of which corresponds with the form of the information carriers to be manufactured. Debouching into mould cavity 10 is a feed 11 for heated plasticized plastic. In a second, open relative position the mould parts 4 and 5 are located at a mutual distance such that mould cavity 10 is accessible and essentially does not exist at that moment. This open position is shown in FIG. 1.

The injection moulding device 2 further comprises positioning means for holding at a desired position an information component, in this case a plate or stamper for placing against an end wall 12 of mould cavity 10, on which the information for recording onto the information carrier is found in negative form, which information component remains in position relative to mould cavity 10 during removal of a formed information carrier. In order to hold a stamper 13 in position use is made in this embodiment of a number of holes 14 in end wall 12 which hold the stamper in position with underpressure.

The auxiliary device 1 comprises a number of supply holders 15 serving as supply holders in which a number of stampers 13 can be received in separate compartments. A transporting device 16 serves to transport successive stampers between supply holder 15 and mould 4, 5.

The individual compartments 17 are made accessible by sliding a cover member 18 by means of a cylinder unit 19.

The transporting device 16 comprises an arm 20, on the one end of which are situated three suction cups 21. Using these suction cups a stamper 13 can be gripped for removal from a compartment 17 and for transport in the direction of the mould 4, 5 by swinging the arm 20 as according to arrow 22. As shown in FIG. 1, the arm 20 cannot pass the guide rods 8. In this respect the arm 20 is retracted in an elevated position thereof by energizing cylinder unit 23, so that with further rotation it can pass the relevant rod 8. After reaching a relevant, in this case horizontal, position, the arm can again be extended to place the stamper 13 against the end wall 12, where by energizing a source of air under underpressure it is sucked fixedly against end wall 12 via holes 14.

It will be apparent that the reverse displacement is also possible.

It is noted that FIG. 1 shows no control means with which the diverse components are functionally adapted to each other in time.

The various compartments 17 can be placed at a desired location, also under control of a central processing unit which includes a control program, such that a stamper 13 taken out of mould 4, 5 can be placed in an empty and, if desired, preselected compartment 17, or a selected compartment 17 can be placed at the relevant removal location for transporting the stamper 13 present in that compartment 17 to the mould 4, 5.

Via a source (not drawn) of air under a small overpressure air under a slight overpressure can be blown via a feed 27 into the supply holder 15. The air is made dust-free beforehand. This provision ensures that the stampers 13 present in supply holder 15 remain stored as dust-free as possible.

Figure 2:
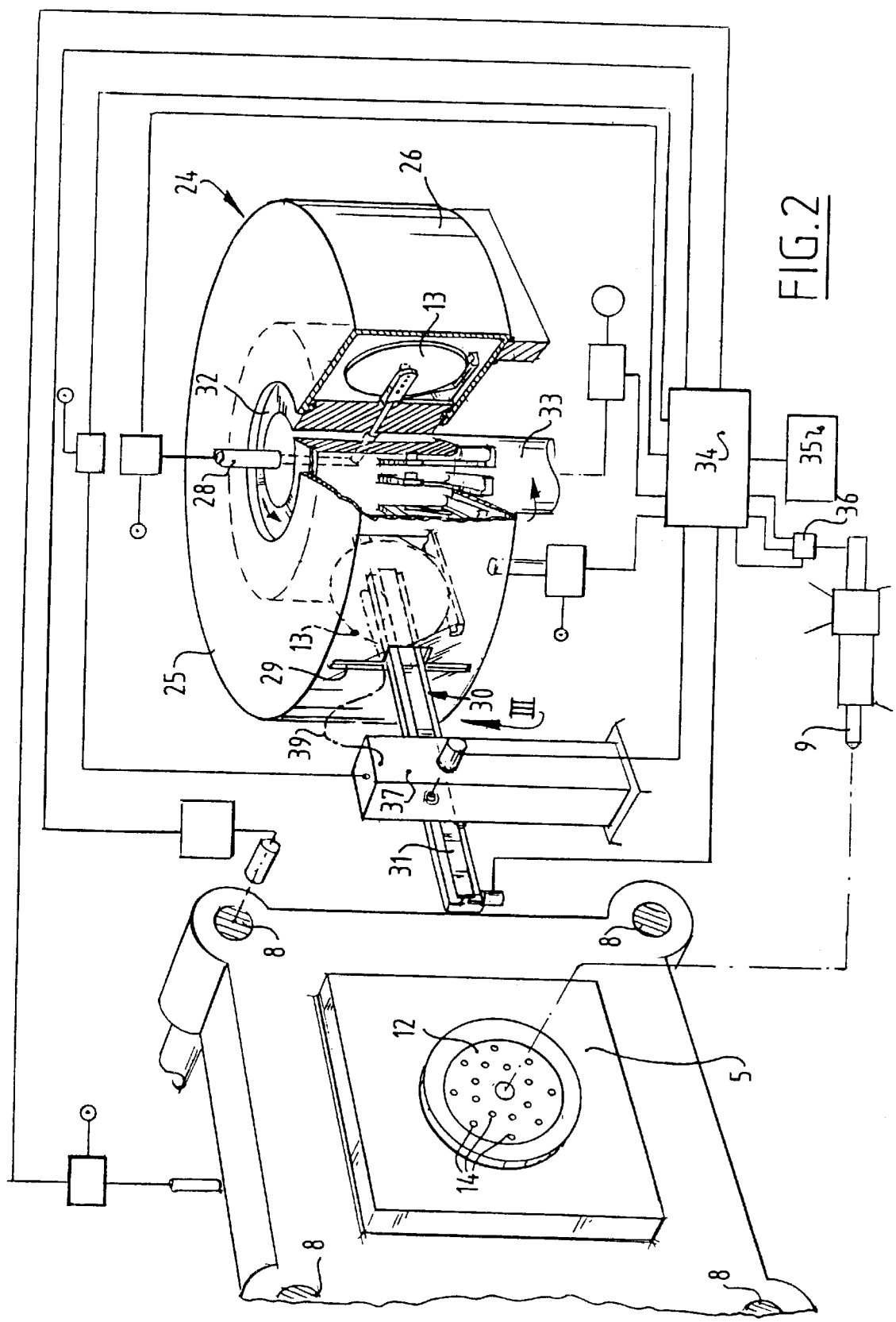
FIG. 2 shows a partly broken away perspective view of an auxiliary device and mould, partially in (block) schematic form, wherein the supply holder is rotatable.

FIG. 2 shows a variant in which the auxiliary device 24 comprises an annular supply holder 25.

The supply holder comprises a stationary housing 26 which via a feed 28 receives dust-free air under a slight overpressure. The interior of supply holder 25 is accessible via a slot-like opening 29 with a central widening 30 through which the stampers 13 can be transported making use of a transporting arm 31. In this respect reference is made to the discussion of FIG. 3 hereinbelow.

A carrier turntable 32 is placed in the stationary supply holder 26. Turntable 32 can be rotated by means of a motor 33, wherein means are present for sensing the angular position of turntable 32 relative to the slot 29, 30 such that a desired location of the turntable corresponds with the position of slotted hole 29, 30. A central processing unit 34 with input 35 controls auxiliary device 24 and synchronizes the diverse, mutually co-acting components. The CPU 34 also receives via a data input 36 data relating to the open or closed position of mould 4, 5.

Figure 3:
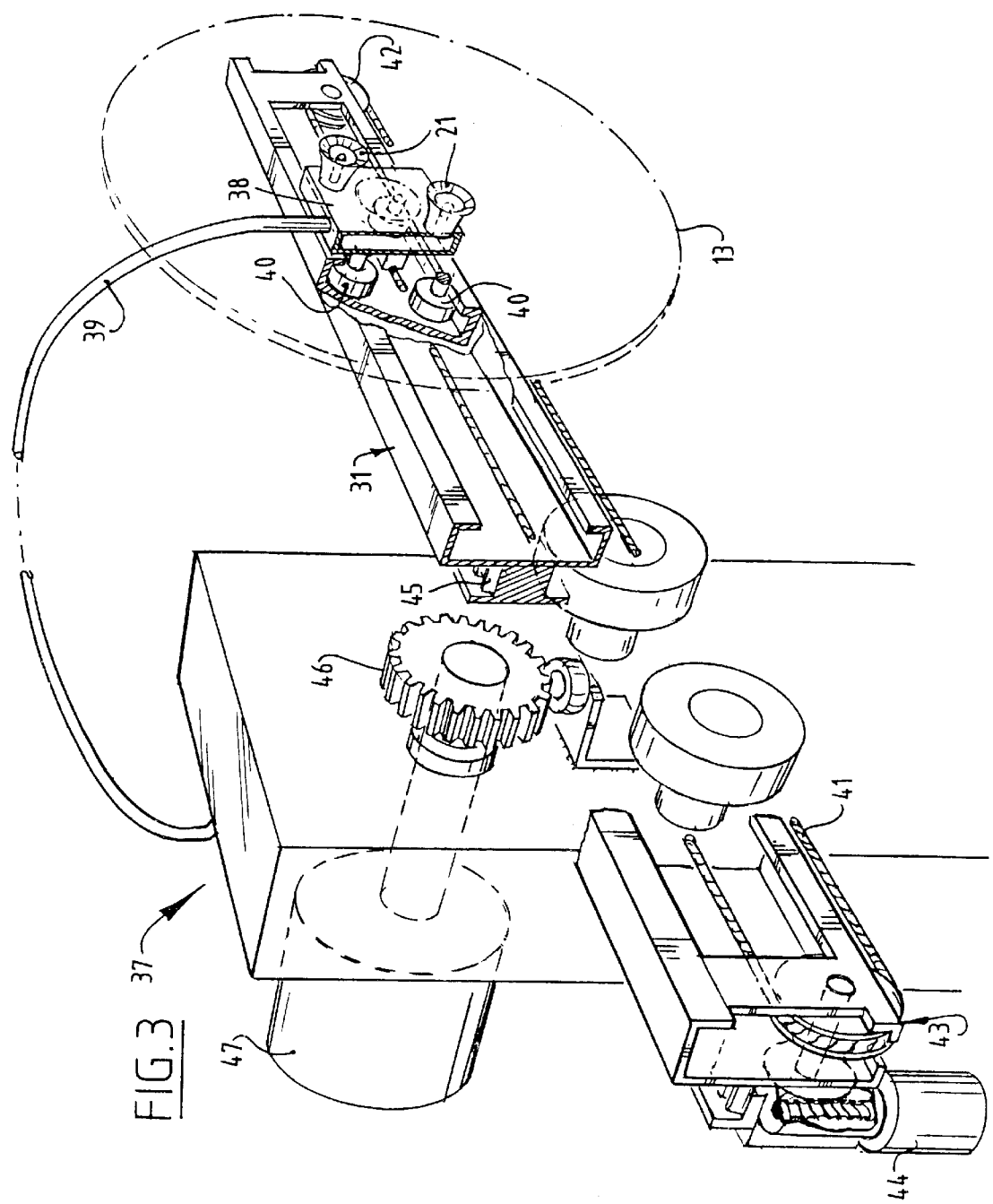
FIG. 3 shows the detail III of FIG. 2 on enlarged scale and in partly broken away perspective view.

FIG. 3 shows the manner in which a stamper 13 can be displaced by means of the transporting device 37 of which the arm 31 forms part.

A carriage 38 can travel along the arm 31. Carriage 38 carries the suction cups 21 as in FIG. 1, which are connected via a suction line 39 to a source of air under underpressure (not drawn). By means of rollers 40 the carriage can be displaced along the arm 31 which is embodied for this purpose as a profile beam open to one side, as shown clearly in FIG. 3. An endless cord 41 is connected to carriage 38 for transport. This cord 41 is trained round a reversing roller 42 and a drive roller 43 which is driven by a motor 44. The carriage 38 can thus travel reciprocally along the arm 31. The arm itself can move reciprocally by means of a rack 45 which is driven by a tooth wheel 46 which is connected in turn to a motor 47.

By suitable control of the motors 44 and 47 and adapted energizing of the underpressure means for controlling the suction cups 21, a stamper can be moved out of supply holder 25 to mould 4, 5 and vice versa.

It is noted that for the sake of clarity drawing of the two mutually co-acting heads according to the invention has been omitted in FIGS. 1, 2 and 3. It should however be appreciated that the invention relates specifically to the use of a combination of two heads as transporting means.

Figure 4:
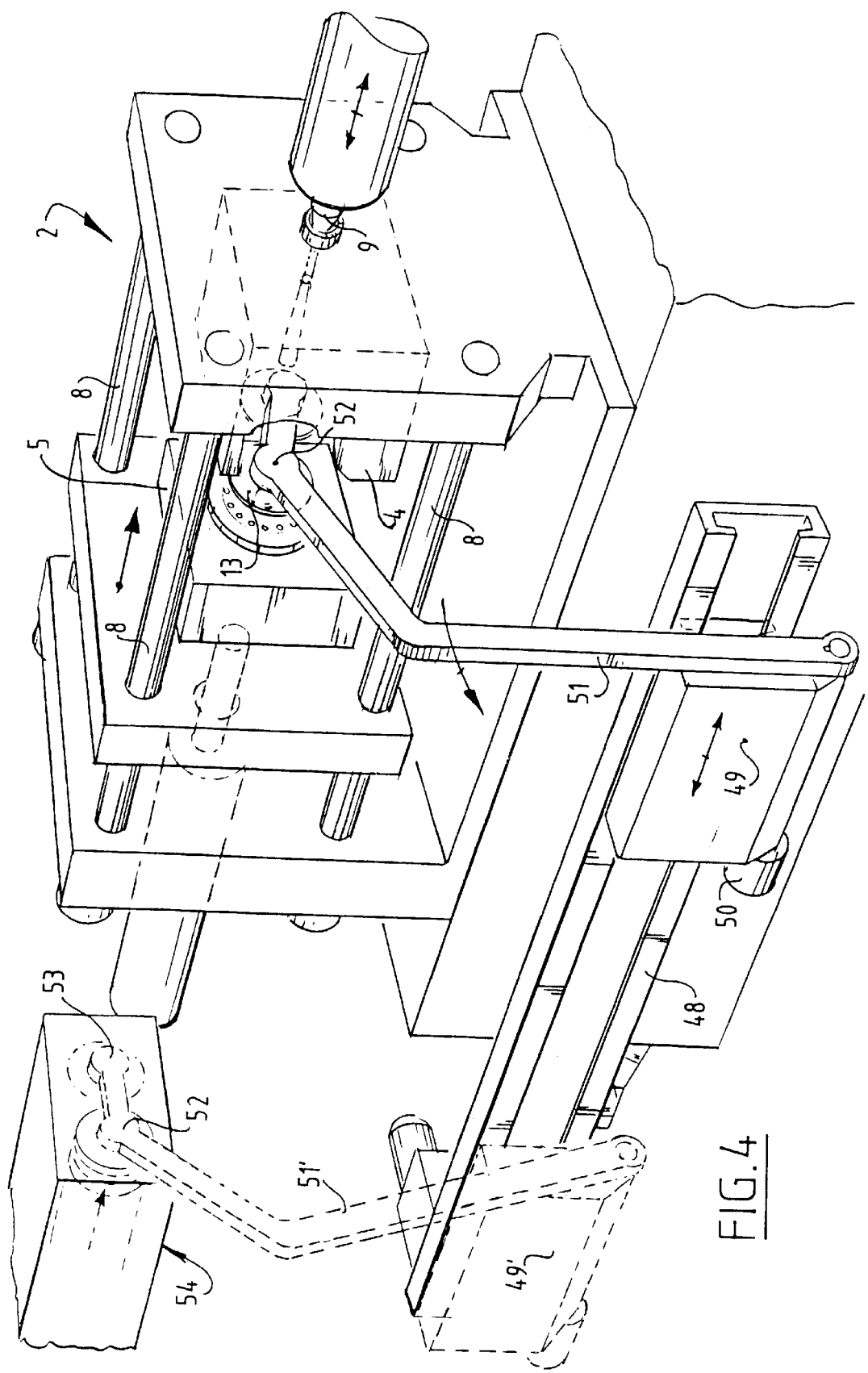
FIG. 4 shows a partly perspective view of a variant.

FIG. 4 shows the injection moulding device 2 to which is added an auxiliary device 48 of another type. In this case a carriage 49 is drivingly displaceable by means of a motor 50 in lengthwise direction relative to the mobility of the mould 4, 5. Carriage 49 bears a bent arm 51 with two active end zones 52, 53 which are each embodied with energizable suction cups. The heads 52, 53 are placed at identical radial positions relative to the pivot axis defined by motor 50. The structure ensures a free mobility of the active end zones 52, 53 including a picked-up stamper, without obstruction herein being encountered due to the presence of the guide rods 8. In this embodiment the carriage 49 can be moved from the position indicated with full lines, which corresponds with the position of the opened mould 4, 5, to the position 49' designated with dashed lines in which stampers 13 can be placed into or removed from a magazine 54.

The use of a double head has the advantage that in one work operation with the removal of a stamper the following stamper can be placed, which can provide a considerable time-saving.

Figure 5:
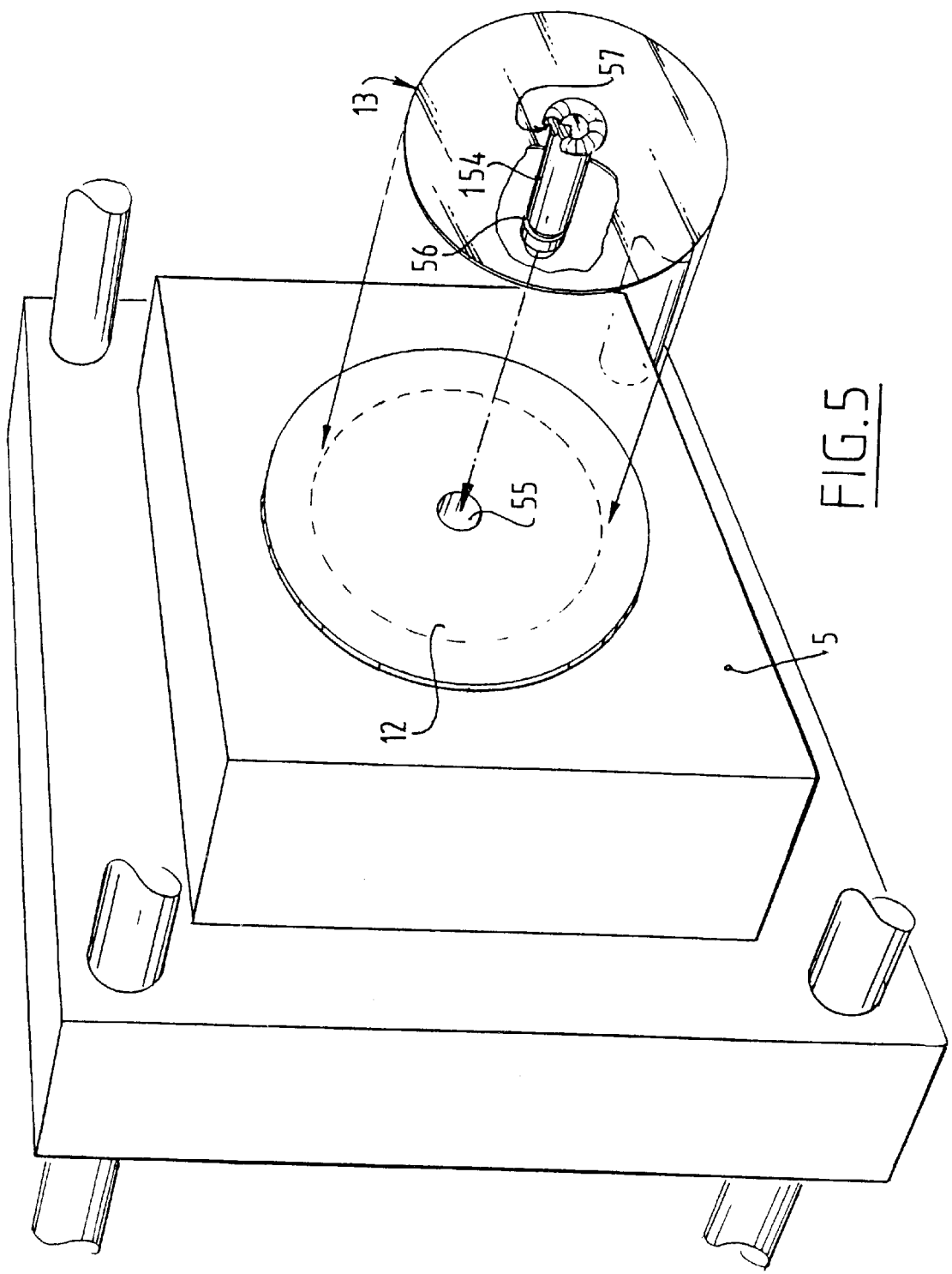
FIG. 5 is a perspective view of a part of an injection mould with mechanical positioning means.

FIG. 5 shows the manner in which a stamper 13 can be held in position against the end wall 12. Use is made in this case of mechanical holding means in the form of a central centering and positioning pin 154 which can be inserted into the central hole of stamper 13 and fits into a positioning hole 55 in end wall 12. A groove 56 serves to hold the positioning pin 154 in the processing position. Pin 154 bears on its end a small widening which has sufficient radial and axial dimensions to firmly secure a stamper, but nevertheless leaves only a minimal mark in the formed end product. In this respect the holding edge 57 is drawn exaggeratedly large in relation to the actual dimensions for the sake of clarity.

Figure 6:
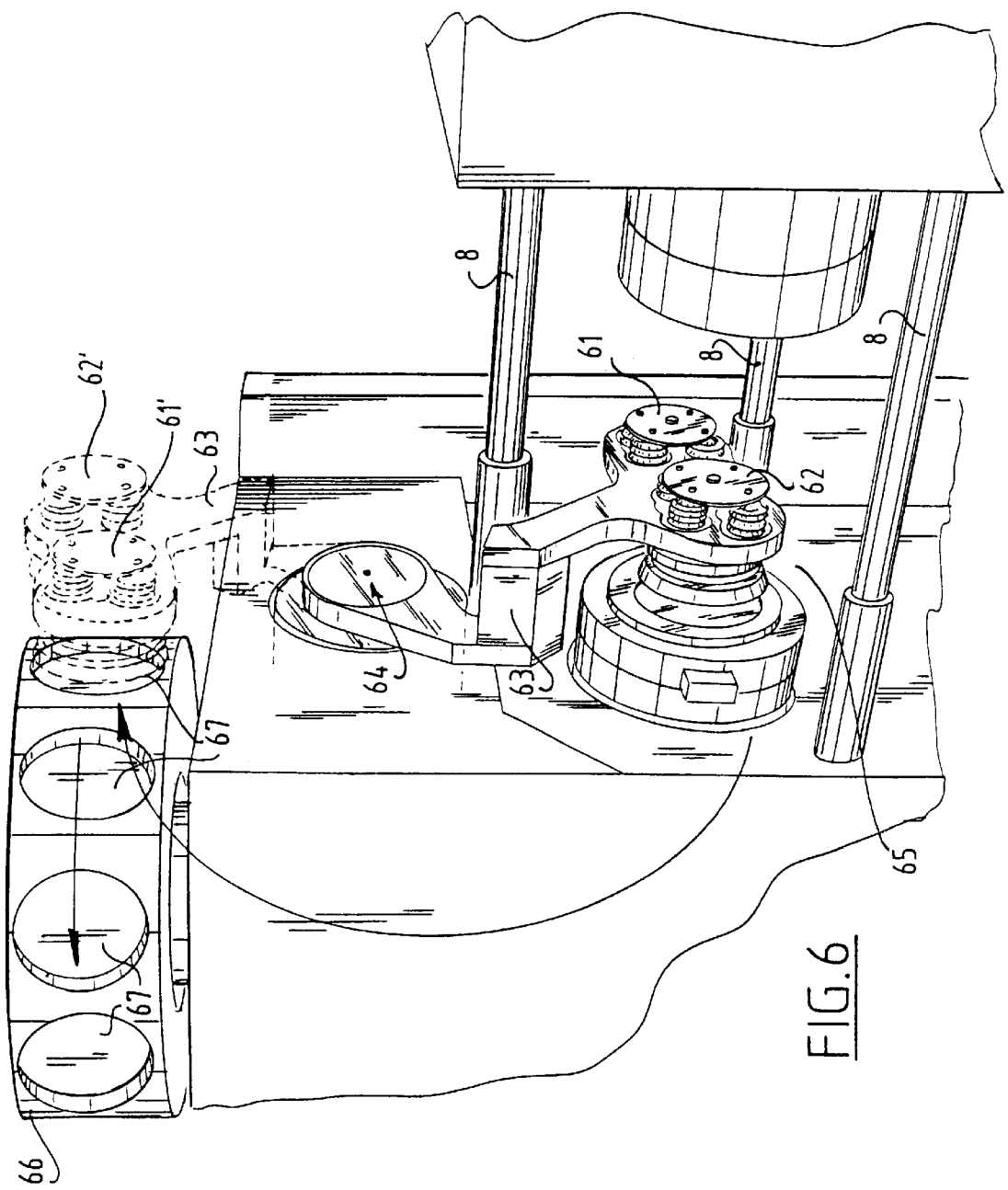
FIG. 6 is a partly perspective view of a detail of a preferred embodiment.

FIG. 6 shows a structure, the principle of which corresponds with that according to FIG. 4. The heads 61 and 62 are carried by an arm 63 which is pivotable under the influence of a drive (not shown). The pivot centre is designated with 64. Shown with broken lines is that the arm can be pivoted with the heads to a position in which the heads are not situated in the region of the mould 65 but in the region of a horizontally rotatable supply holder 66. In this position shown with broken lines the arm is designated with 63' and the heads respectively with 61' and 62'.

In this embodiment the control means can be adapted to control the heads 61, 62 by pivoting arm 63 such that the heads are temporarily halted in their path between supply holder (61', 62') and mould (61, 62) for manual placing and removal of a stamper.

It is noted that supply holder 66 is embodied such that positioning provisions 67 into which insert plates can be taken are situated in largely tangential positions.

Figure 7:
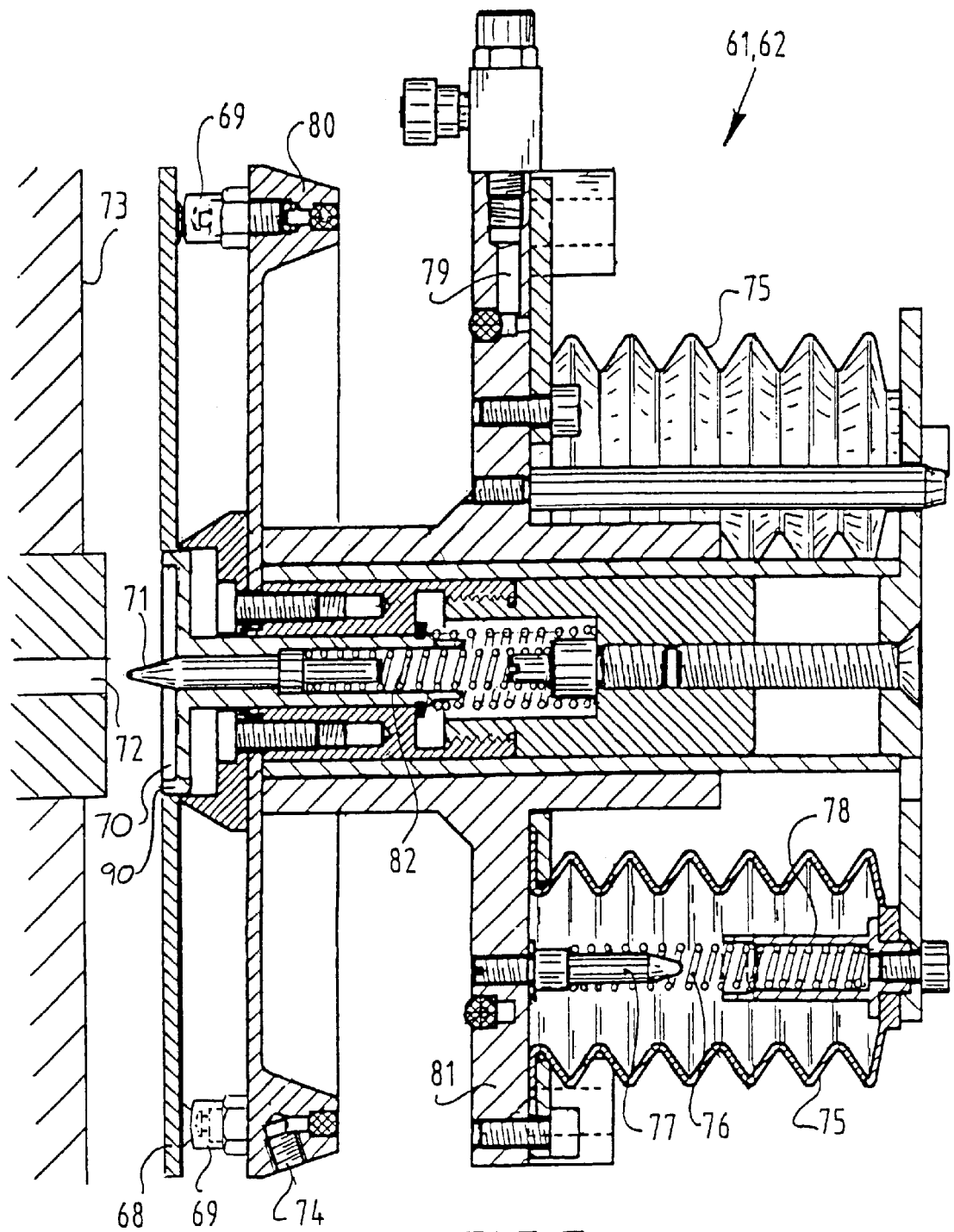
FIG. 7 shows partly in side view and partly in longitudinal section a head as according to FIG. 6.

FIG. 7 shows a head 61 or 62. Each head 61, 62 includes an auxiliary head which includes an annular support surface for carrying an insert plate 68 and a positioning cylinder. The insert plate 68 is supported by suction cups 69. The insert plate 68 has a central hole 70 through which extends a blunt, tapering centering pin 71 which serves for co-action with hole 72 debouching on mould wall 73. The positioning cylinder 90 is placed co-axially with the centering pin 71 and co-acts in a positioning manner within the central hole 70 in the insert plate 68.

Suction cups 69 are connected to a controllable source of underpressure via connection 74. Bellows 75 enclose respective pressure springs 76 which co-act with respective centering pins 77 and sleeves 78. Via a controllable source of underpressure, connected via a conduit system designated with 79, the bellows 75 can be subjected to an underpressure whereby an effective shortening occurs which results in a displacement of carrier plate 80 relative to frame 81. A spring system 82 loads centering pin 71 relative to the auxiliary head and the frame 71.

Attention is drawn to the fact that centering means other than those drawn are also possible, for instance sensors having added thereto electronics and suitable control means. What is essential according to the invention is the use of two heads, whereby a large time-saving can be achieved in changing of the insert plates.

Compared to the prior art the invention provides a time required for the changing of an insert plate that is very substantially shortened. Also as a result of the very short standstill period the danger of degeneration of heated material in the nozzle during standstill is considerably reduced. Due to the short changing time the invention further reduces to a very considerable extent the thermal instabilities typical of the prior art due to the long cooling times of components with which successive formed information carriers come into contact.

What is claimed is:

1. An auxiliary device intended to be added to an injection moulding device for manufacturing disc-like information carriers, wherein:
   A) the injection moulding device comprises:
      (i) a mould having at least two mould parts displaceable relative to each other, which in a first relative position bound a mould cavity, a form of which corresponds with the form of the information carriers for manufacture, into which mould cavity debouches a feed for heated plastic, which in a second relative position are located at a distance from each other such that the mould cavity is accessible, and
      (ii) holding means for holding an insert plate in a desired position on the mould cavity, wherein the plate contains information to be recorded onto the information carrier, such that an insert plate remains in position relative to the mould cavity when a formed information carrier is removed; and wherein:
   B) the auxiliary device comprises:
      (i) a supply holder in which can be received at least one insert plate,
      (ii) transporting means for transporting successive insert plates between the supply holder and the mould, which transporting means comprise two heads which are each adapted to displace successive insert plates in an axial direction to and from an end wall of the mould cavity, all of which plates are provided with a central continuous hole, and which two heads each comprise centering means for placing an insert plate in correct position relative to the end wall by making use of the continuous hole in the insert plate, wherein said centering means is comprised of an auxiliary head which includes an annular support surface for carrying an insert plate and a positioning cylinder received within the continuous hole of the insert plate, and a centering pin extending from each head within the positioning cylinder and through the continuous hole of the insert plate, the centering pin having a free end and narrowing from a diameter of the centering pin to form a continuous taper toward the free end, wherein the centering pin during positioning and/or removal of an insert plate extends into the mould cavity and which can co-act along a length of the taper for fully engaging a central positioning hole which extends through the mould wall against which an insert plate must be positioned; wherein the centering pin is spring-loaded and biased away from the auxiliary head which is axially movable by means of drive means for placing and removal of an insert plate, and
      (iii) control means connectable to the injection moulding device, which control means are adapted to release the transporting means only in the second relative position of the mould parts in order to transport an insert plate from or to the mould, which control means are adapted to control the holding means, and wherein the transporting means are controllable by the control means.

2. The auxiliary device as claimed in claim 1, wherein the heads are supported by a collective carrier which is controllable by the control means.

3. The auxiliary device as claimed in claim 2, wherein the carrier has a degree of freedom of translation.

4. The auxiliary device as claimed in claim 2, wherein the carrier has a degree of freedom of rotation.

5. The auxiliary device as claimed in claim 4, wherein the carrier is pivotable around a pivot axis, relative to which the heads are equidistant.

6. The auxiliary device as claimed in claim 1, wherein the supply holder comprises a closable supply holder.

7. The auxiliary device as claimed in claim 6, wherein the supply holder comprises individually closable compartments, in each of which an insert plate can be received.

8. The auxiliary device as claimed in claim 6, wherein the supply holder can be connected to a source of substantially dust-free gas to provide a gas flow.

9. The auxiliary device as claimed in claim 7, wherein each compartment can be connected to a source of gas under pressure.

10. The auxiliary device as claimed in claim 1, wherein the supply holder and the transporting means are relatively movable and positionable such that the transporting means can remove an insert plate from the supply holder or place it therein at a chosen location thereof.

11. The auxiliary device as claimed in claim 10, comprising a central processing unit in which is pre-recorded data relating to the insert plate present at each location in the supply holder and relating to the desired sequence for control of the positioning of the supply holder in relation to the transporting means.

12. The auxiliary device as claimed in claim 11, wherein the central processing unit comprises memory means into which is read in each case which insert plate is arranged at a specific location in the supply holder.

13. The auxiliary device as claimed in claim 1, wherein the pin has a blunt end.

14. The auxiliary device as claimed in claim 1, wherein the heads have heating means.

15. The auxiliary device as claimed in claim 1, wherein the control means are adapted to control the heads such that they are temporarily halted in their path between the supply holder and the mould for manual placement or removal of an insert plate.

16. The auxiliary device as claimed in claim 1, wherein the transporting means comprise a stepping motor.

17. The auxiliary device as claimed in claim 1, wherein the holding means are mechanical.

18. The auxiliary device as claimed in claim 1, wherein the holding means are a magnet.

19. The auxiliary device as claimed in claim 1, wherein the holding means are based on suction.

20. The auxiliary device as claimed in claim 1, wherein the supply holder is horizontally displaceable.

21. The auxiliary device as claimed in claim 1, wherein the supply holder is rotatable.

22. The auxiliary device as claimed in claim 8, wherein the gas flow is substantially laminar.

23. The auxiliary device as claimed in claim 8, wherein the gas flow is directed downward.

24. The auxiliary device as claimed in claim 8, further comprising ionization means for ionizing the gas.

25. The auxiliary device as claimed in claim 24, wherein the ionization means comprise corona means.

26. The auxiliary device as claimed in claim 1, wherein the central processing unit is also adapted to adjust process parameter values relevant for the injection moulding process on the basis of certain, predetermined properties of an insert plate, corresponding with the playing time of a CD to be manufactured therewith.

27. The auxiliary device as claimed in claim 1,
wherein the drive means comprise a number of pneumatic cylinders which are connected to an on/off switchable vacuum source and which are connected between a main frame of a head and the auxiliary head such that when the vacuum source is switched on the auxiliary head is displaced outward relative to said main frame, wherein after the vacuum source has been switched off the auxiliary head is returned to an inward directed rest position by resetting spring means.

28. The auxiliary device as claimed in claim 1,
wherein the drive means comprise a number of bellows which are connected to an on/off switchable vacuum source and which are connected between a main frame of a head and the auxiliary head such that when the vacuum source is switched on the auxiliary head is displaced outward relative to said main frame, wherein after the vacuum source has been switched off the auxiliary head is returned to an inward directed rest position by resetting spring means.

29. The auxiliary device as claimed in claim 7, wherein each compartment can be connected to a source of gas under pressure.

30. The auxiliary device of claim 1, wherein the annular insert plate support received within the continuous hole of the insert plate is independently spring biased away from the auxiliary head.

* * * * *